(12) United States Patent
Yata

(10) Patent No.: US 8,121,469 B2
(45) Date of Patent: Feb. 21, 2012

(54) AUTOFOCUS SYSTEM

(75) Inventor: Kunio Yata, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 149 days.

(21) Appl. No.: 12/751,312

(22) Filed: Mar. 31, 2010

(65) Prior Publication Data

US 2010/0254689 A1    Oct. 7, 2010

(30) Foreign Application Priority Data

Apr. 3, 2009   (JP) ................................ P2009-091432

(51) Int. Cl.
  *G03B 3/10*    (2006.01)
  *H04N 5/225*   (2006.01)
(52) U.S. Cl. ........................................ 396/95; 348/169
(58) Field of Classification Search .................. 396/95, 396/104, 123, 124, 147; 348/169, 333.03, 348/345, 346, 352
  See application file for complete search history.

(56) References Cited

U.S. PATENT DOCUMENTS

2005/0046626 A1 *  3/2005  Yoda et al. ................... 345/419
2006/0210260 A1    9/2006  Yata
2010/0149343 A1 *  6/2010  Kim et al. .................... 348/169

FOREIGN PATENT DOCUMENTS

JP         2006-258944 A        9/2006

* cited by examiner

*Primary Examiner* — W. B. Perkey
*Assistant Examiner* — Minh Phan
(74) *Attorney, Agent, or Firm* — Birch, Stewart, Kolasch & Birch, LLP

(57) ABSTRACT

An autofocus system includes an image pickup unit that takes a subject image formed by an optical system; an autofocus unit that performs focus adjustment on the optical system so as to bring into focus a subject within a predetermined AF area in a photographing image taken by the image pickup unit; a tracking unit that moves an AF frame, which indicates an outline of the AF area, in accordance with the movement of the subject within the photographing image taken by the image pickup unit; a face direction detection unit that detects a face direction of the subject from the photographing image; a face direction registration unit that registers the face direction of the subject together with coordinates which represent a position of the AF frame in the photographing image; a face direction comparing unit that compares the detected face direction of the subject with the registered face direction.

6 Claims, 7 Drawing Sheets

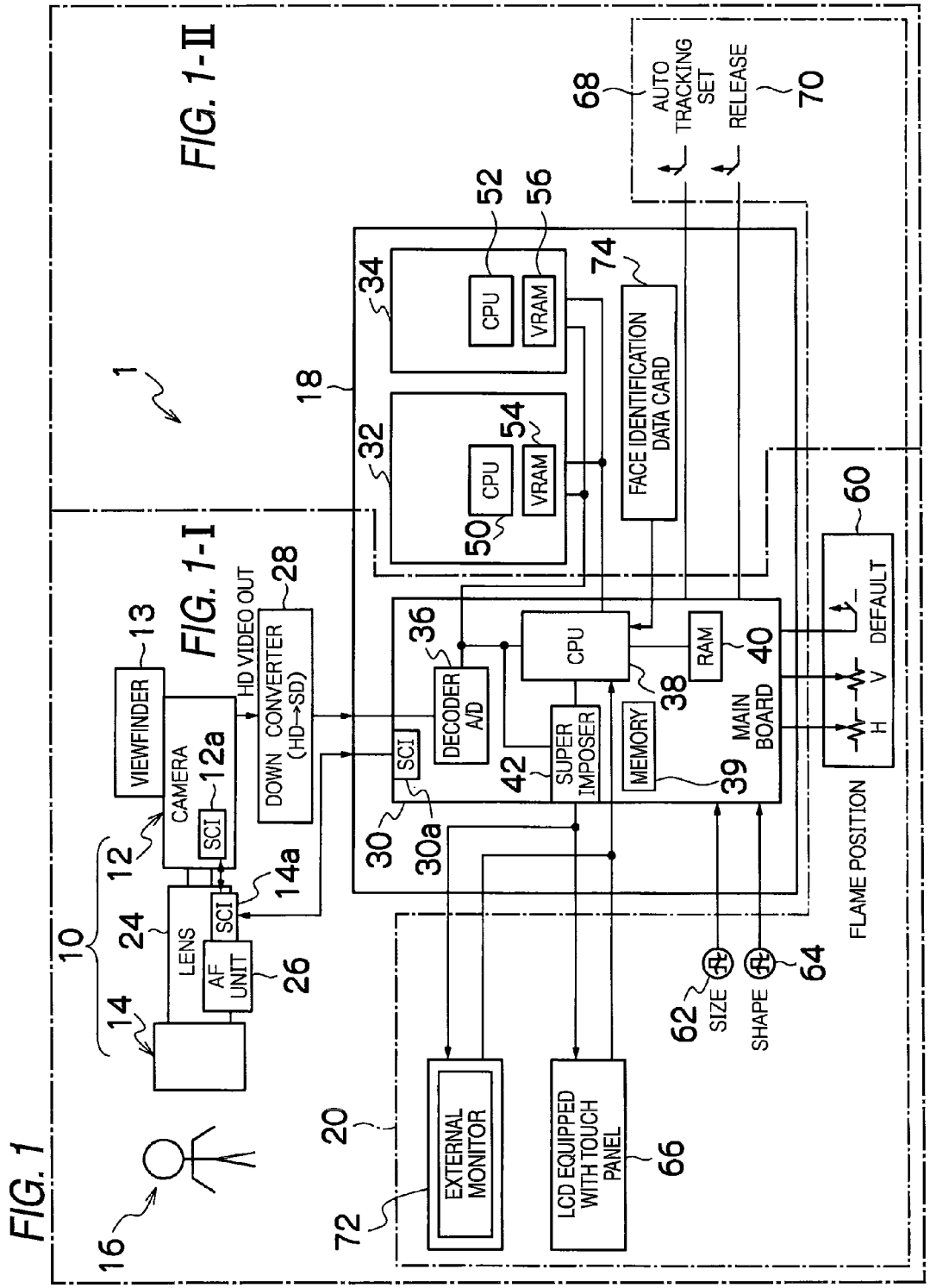

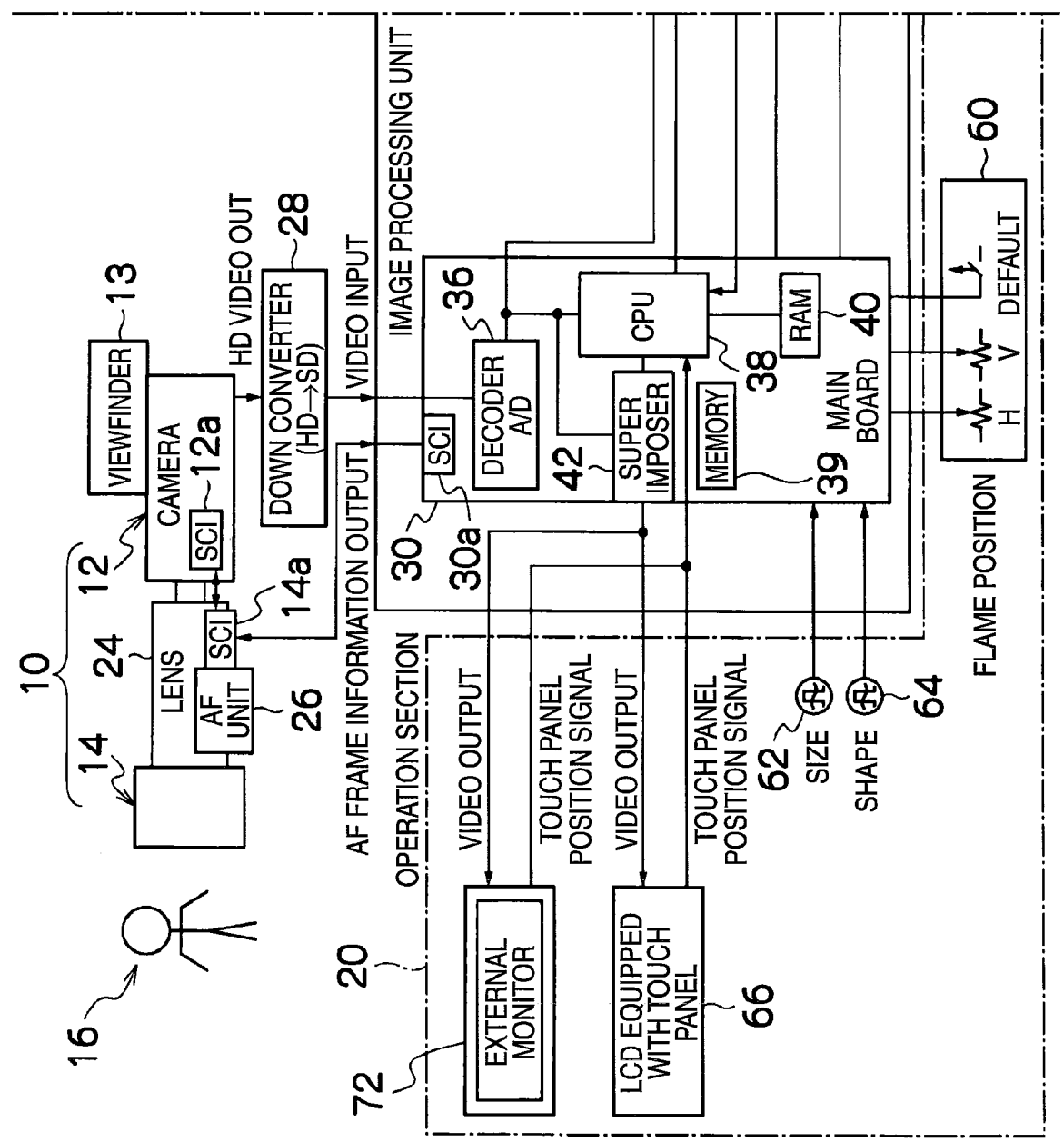
FIG. 1-I

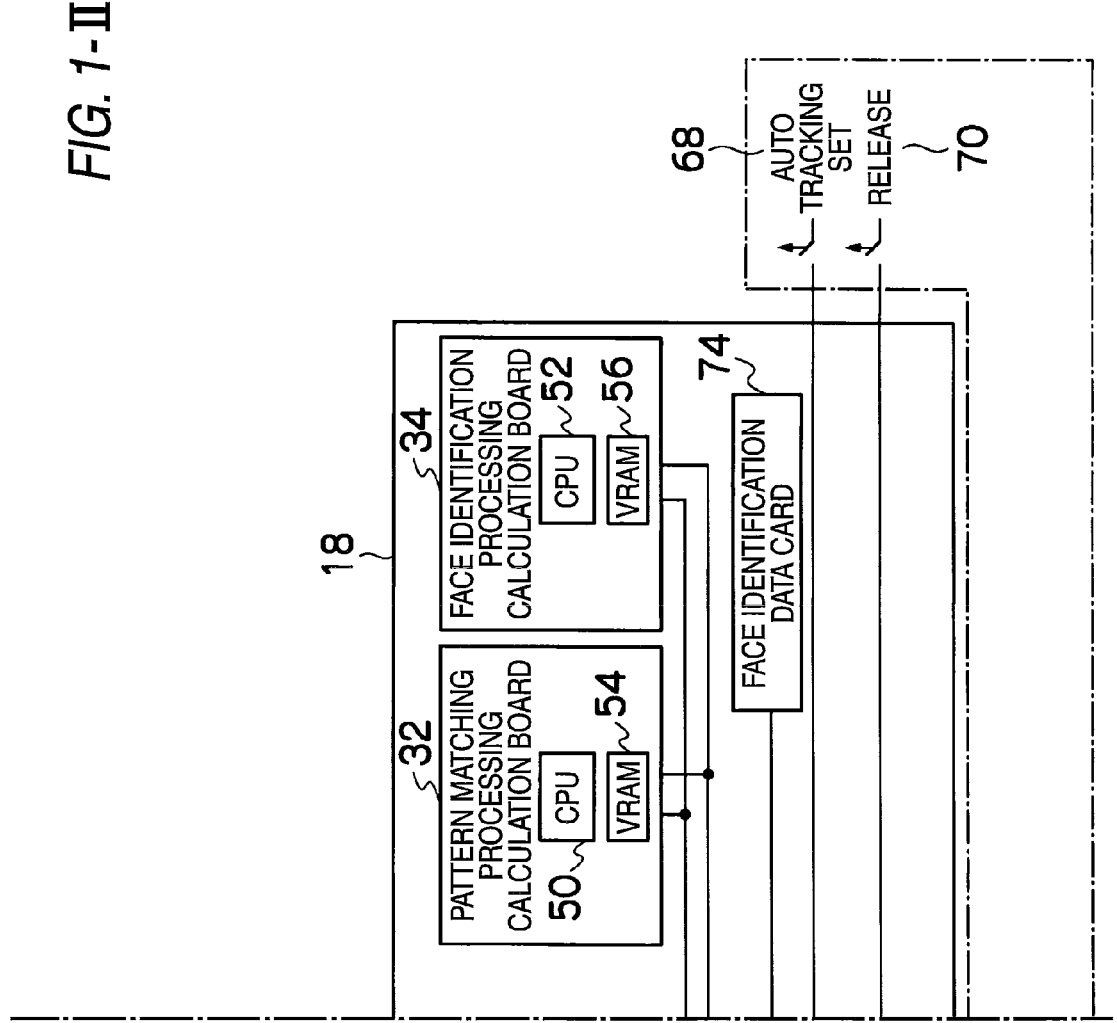

AUTOFOCUS SYSTEM

CROSS-REFERENCE TO RELATED APPLICATIONS

This application is based on and claims priority under 35 USC 119 from Japanese Patent Application No. 2009-091432 filed on Apr. 3, 2009; the entire contents of which are incorporated herein by reference.

BACKGROUND

1. Technical Field

The present invention relates to an autofocus system, and relates, in autofocus systems for automatically tracking an AF frame, particularly to an autofocus system for performing tracking through face direction determination processing when a plurality of persons moving in a photographic scene pass across each other or pass in front of another person.

2. Related Art

Generally, in autofocus (AF) systems for automatically adjusting the focus of a camera, the camera needs instruction on where to focus. In general cameras, the focusing position is fixed in the center of a photographing area, for example a person and the like at the center of the photographing area are made to come into focus. In addition, as an autofocus (AF) method, there is used a contrast method of detecting the contrast of a subject image from an image signal acquired by the image pickup device and automatically adjusting the focus to a best focus state by controlling the focal length of a photographic lens so as to maximize the contrast.

The area of a subject as an AF target in the photographing area of a camera or the on-screen area of a subject as an AF target on a screen of the reproduced photographing image of a camera is defined as an AF area. In addition, the frame indicating the outline of the AF area is defined as an AF frame.

However, when a moving subject is photographed, it is not preferable that the focusing position is fixed as described above. For example, when a quickly moving subject in sporting scenes may be photographed by a television camera and the like, it is required to detect and track the target subject to be brought into focus in the photographing image.

For example, Patent Document 1 (JP-A-2006-258944 corresponding to US-A-2006/0210260) and the like disclose systems capable of automatically tracking an AF frame by storing a subject image of the focusing target (the in-focus target) as a reference pattern, detecting an image which is the best match to the reference pattern image in the photographing image of the newly acquired frame in a pattern matching method, and detecting the position of the target subject.

However, in the autofocus systems for automatically tracking the AF frame, there is a problem in that tracking fails or a person who is not a tracking target is tracked when a plurality of persons pass across each other or another person passes across the front of the tracking target person on the screen.

SUMMARY

An object of the invention is to provide an autofocus system for automatically tracking the AF frame, particularly, to provide an autofocus system capable of reliably tracking an initial tracking target even when a plurality of persons pass across each other or another person passes across the front of the tracking target person on the screen.

[1] According to an aspect of the invention, an autofocus system includes: an image pickup unit that takes a subject image formed by an optical system; an autofocus unit that performs focus adjustment on the optical system so as to bring into focus a subject within a predetermined AF area in a photographing image taken by the image pickup unit; a tracking unit that moves an AF frame, which indicates an outline of the AF area, in accordance with the movement of the subject within the photographing image taken by the image pickup unit; a face direction detection unit that detects a face direction of the subject from the photographing image; a face direction registration unit that registers the face direction of the subject together with coordinates which represent a position of the AF frame in the photographing image; and a face direction comparing unit that compares the detected face direction of the subject with the registered face direction. Tracking of the subject is performed by comparing the face direction, which is detected from the subject within the photographing image, with the registered face direction.

With such a configuration, in the autofocus system for automatically tracking the AF frame, it is possible to track an initial tracking target reliably even when a plurality of persons pass across each other or another person passes across the front of the tracking target person on the screen.

[2] According to the autofocus system of [1], whenever the photographing image is loaded, the face direction which is detected from the photographing image by the face direction detection unit may be registered, and the AF frame may be updated.

As described above, by retaining the latest face direction and the AF frame, it is possible to obviate failure in tracking.

[3] According to the autofocus system of [1] or [2], when the face direction comparing unit detects only one person as a subject whose face direction is the same as the registered face direction in the photographing image, tracking of the subject who is the one person may be performed.

As described above, it is possible to identify the tracking target on the basis of the face direction.

[4] According to the autofocus system of [1] or [2], when the face direction comparing unit detects a plurality of subjects whose face directions are the same as the registered face direction in the photographing image, the face direction comparing unit may additionally compare coordinates representing positions of AF frames in the photographing image, with the coordinates of the registered AF frame, and tracking of the subject may be performed on a subject corresponding to coordinates of an AF frame closet to the coordinates of the registered AF frame.

With such a configuration, it is possible to track the tracking target reliably even when there is a plurality of subjects having the same face direction in the photographing image.

[5] According to the autofocus system of [1], when the face direction comparing unit does not detect the subject whose face direction is the same as the registered face direction in the photographing image, the face direction registration unit may not register the face direction detected from the latest photographing image, and the tracking unit may not update the AF frame.

As described above, when the same face direction is not detected, it can be assumed that a subject having a different face direction has passed across the front of the tracking target. In such a case, by not performing registration of the face direction and updating of the AF frame, it is possible to prevent a subject, who is not a tracking target, from being tracked.

[6] According to the autofocus system of [1], when a size of the AF frame of the subject tracked at a current time is abruptly and significantly changed relative to a size of the AF frame registered at a previous time, the face direction registration unit may not register the face direction of the subject whose AF frame size is abruptly and significantly changed, and the tracking unit may not update the AF frame to the AF frame whose size is significantly changed.

As described above, when the size of the AF frame of the currently tracked subject is abruptly and significantly changed, it can be assumed that a subject having the same face direction has passed across the front of the tracking target. In such a case, by not performing registration of the face direction and updating of the AF frame, it is possible to prevent a subject, which is not a tracking target, from being tracked.

As described above, with the configurations of [1] to [6], in the autofocus system for automatically tracking the AF frame, it is possible to track an initial tracking target reliably even when a plurality of persons pass across each other or another person passes across the front of the tracking target person on the screen.

BRIEF DESCRIPTION OF THE DRAWINGS

FIG. 1 is a block diagram illustrating an entire configuration of a video camera system to which an autofocus system according to an embodiment of the invention is applied.

FIGS. 1-I and 1-II are partial block diagrams of FIG. 1.

FIGS. 4A and 4B are explanatory diagrams illustrating an exemplary image in a case where there is a plurality of subjects whose face directions are the same as the registered face direction on a screen, in which FIG. 4A shows an image acquired at the previous time and FIG. 4B shows an image acquired at the current time.

DETAILED DESCRIPTION

Figure 2:
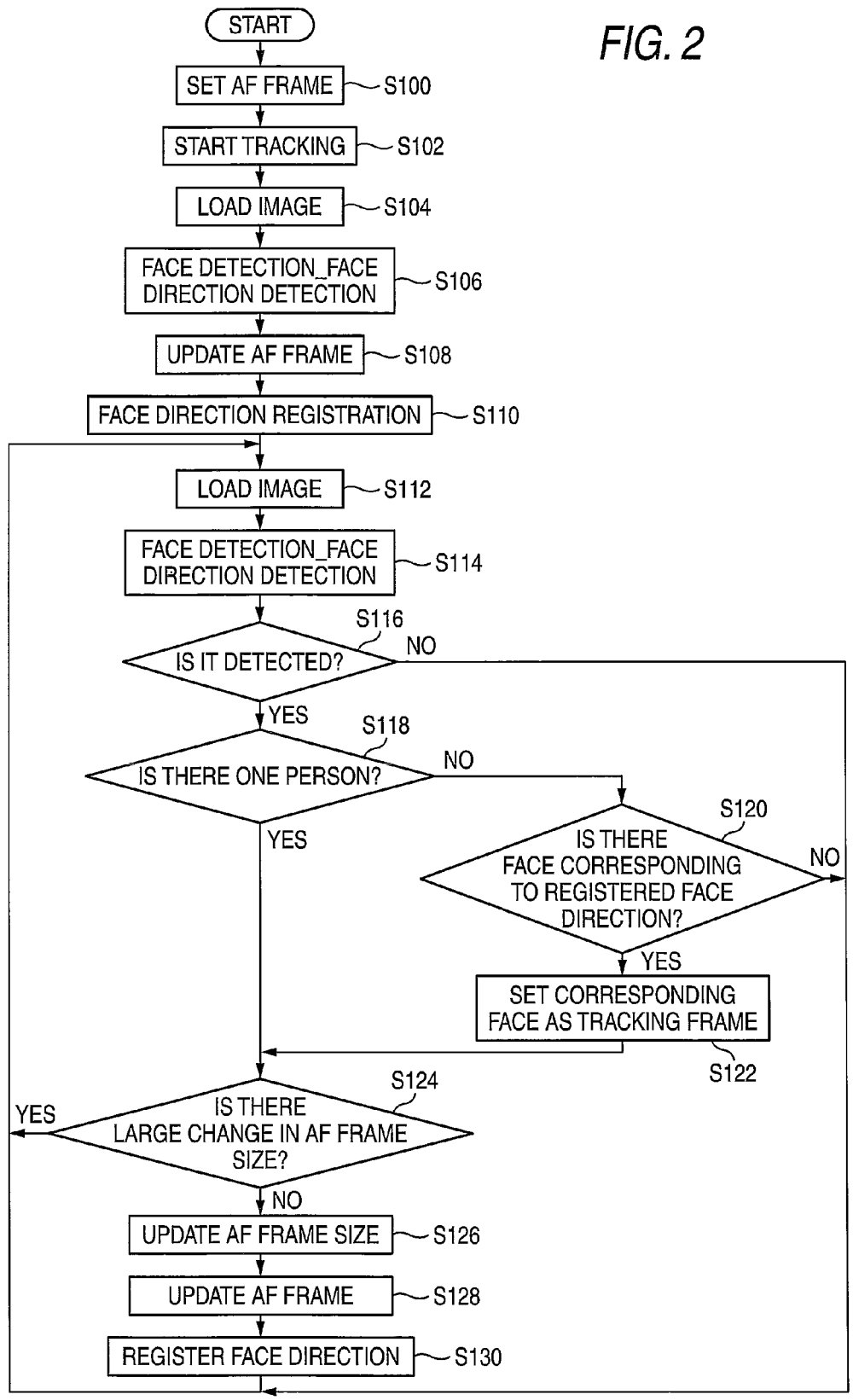
FIG. 2 is a flowchart illustrating an operation of an embodiment of the invention.

Hereinafter, an autofocus system according to an exemplary embodiment of the invention will be described with reference to the accompanying drawings.

FIG. 1 is a block diagram illustrating an entire configuration of a video camera system to which an autofocus system according to an embodiment of the invention is applied. FIGS. 1-I and 1-II are partial block diagrams of FIG. 1. The video camera system is, for example, an image pickup system used in the photographing of a broadcast TV camera.

As shown in FIG. 1, the video camera system 1 according to the embodiment is configured to have a television camera 10, an image processing unit 18, and the like.

Television camera 10 includes a camera main body 12 of an HD camera corresponding to a Hi-Vision TV [HD (High Definition) TV] system, and a lens unit 14 having a photographic lens (an optical system) set on a lens mount of the camera main body 12. Furthermore, although omitted in the drawings, the camera main body 12 is supported on a camera platform so as to be movable in a rotation direction (pan) and in a vertical inclination direction (tilt).

In the camera main body 12, an image pickup device (for example, a CCD), necessary signal processing circuits, and the like are mounted. After an image formed by the photographic lens of the lens unit 14 is photoelectrically converted by the image pickup device, a signal processing necessary for each of the signal processing circuits is performed thereon, and the image is output as a video signal (an HD TV signal) of the HD TV system from a video signal output terminal and the like of the camera main body 12 to the outside.

Further, the camera main body 12 has a viewfinder 13, and is configured to display a video photographed at the current time by the television camera 10 and the like on the viewfinder 13. Furthermore, the viewfinder 13 is configured to display various information. For example, an AF frame as a focusing target area in autofocus to be described later is displayed on a photographing video in a superimposed manner.

The lens unit 14 includes a photographic lens (a zoom lens) 24 set on the lens mount of the camera main body 12. The photographic lens 24 forms an image of a subject 16 on the image pickup surface of the image pickup device of the camera main body 12. Although omitted in the drawings, movable sections for adjusting photographing conditions of a focus lens group, a zoom lens group, and an aperture diaphragm as components are provided in the photographic lens 24. These movable sections are electrically driven by a motor (a servo mechanism). For example, the focus lens group and the zoom lens group are moved in an optical axis direction, focus (a subject distance) adjustment is performed by the movement of the focus lens group, and focal length (a zoom ratio) adjustment is performed by the movement of the zoom lens group.

In the system relating to the autofocus (AF), if only at least the focus lens group is electrically driven, the other movable sections may be manually driven. Further, when the predetermined movable sections are electrically driven by an operation of an operator, the movable section is controlled on the basis of a control signal which is output from operation unit (the operation unit and the like of a controller connected to the lens unit 14) not shown in the drawings in accordance with the operation of the operator, but detailed description thereof is omitted.

The lens unit 14 is also equipped with an AF unit 26 and a lens CPU which is not shown. The lens CPU controls the entire system of the lens unit 14 overall. The AF unit 26 is a processing section for acquiring information required to perform the focus control (autofocus adjustment) based on the AF, and includes an AF processing section and an AF image pickup circuit which are not shown. The AF image pickup circuit is disposed on the lens unit 14 in order to acquire a video signal for AF processing, and includes an image pickup device (referred to as an AF image pickup device) such as CCD and a processing circuit for outputting an output signal of the AF image pickup device as a video signal based on a predetermined format. Furthermore, the video signal output from the AF image pickup circuit is a brightness signal.

On the image pickup surface of the AF image pickup device, light of the subject is imaged which is diverged from light of the subject incident on the image pickup device of the camera main body 12 by a half mirror disposed in the optical path of the photographic lens 24. The photographing area and the subject distance (a distance at which the subject is brought into focus) relative to the image pickup area of the AF image pickup device is set to coincide with the photographing area and the subject distance relative to the image pickup area of the image pickup device of the camera main body 12. In addition, the subject image acquired by the AF image pickup device is set to coincide with the subject image acquired by the image pickup device of the camera main body 12. It is not necessary to make the both photographing areas perfectly coincide with each other. For example, the photographing area of the AF image pickup device may be a large area including the photographing area of the image pickup device of the camera main body 12.

The AF processing section acquires a video signal from the AF image pickup circuit, and calculates a focus evaluation value representing a level of contrast of the subject image on the basis of the video signal. For example, a high frequency signal is extracted by a high pass filter from the video signals acquired from the AF image pickup device, and then a signal of the area corresponding to the AF area as the AF target in the high frequency signal is integrated for each one of screens (each one of frames). With such a configuration, the integrated value acquired for each one of the screens represents the level of contrast of the subject image, and thus the integrated value is sent as the focus evaluation value to the lens CPU.

The lens CPU acquires the information of AF frame (the AF frame information) representing the AF area (the outline) from the image processing unit 18 as described later, and allows the AF processing section to specify an area within the AF frame, which is specified by the AF frame information, as the AF area. Then, the focus evaluation value demanded for the image within the AF area (the video signal) is acquired from the AF processing section.

As described above, whenever the video signal per one screen is acquired from the AF image pickup circuit (whenever the AF processing section demands the focus evaluation value), the focus evaluation value is acquired from the AF processing section, and the focus lens group is controlled so that the acquired focus evaluation value becomes the maximum (the largest value), that is, the contrast of the subject image within the AF frame becomes the maximum. For example, the mountain climbing method is generally known as a control method of the focus lens group based on the focus evaluation value. In this method, when the first lens group is moved in a direction increasing the focus evaluation value and a point, at which the focus evaluation value begins to decrease, is detected, the focus lens group is set at this position. In such a manner, the subject within the AF frame is automatically brought into focus.

The above-mentioned AF processing section acquires the video signal from the AF image pickup device mounted in the lens unit 14 in order to calculate the focus evaluation value. However, it may be possible to adopt a configuration in which the video signal of the video photographed by the image pickup device of the camera main body 12 is acquired from the camera main body 12. In addition, anything may be used as the AF unit for automatically bringing into focus the subject within the AF frame.

Further, connection between the camera main body 12 and the lens unit 14 and connection between the lens unit 14 and the image processing unit 18 have been made directly or through a cable by using serial communication connectors, which are provided to the units. Thereby, the camera main body 12 and the lens unit 14 are configured to transmit and receive various information through serial communication interfaces (SCI) 12*a* and 14*a*, which are provided to the units, on the basis of serial communication. Further, the lens unit 14 and the image processing unit 18 are configured to transmit and receive various information through serial communication interfaces (SCI) 14*a* and 30*a*, which are provided to the units, on the basis of serial communication.

Further, a video output connector of the camera main body 12 and a video input connector of the image processing unit 18 are connected through a cable with a down converter 28 interposed therebetween. With such a configuration, an HD TV signal output from the video output connector of the camera main body 12 is converted (down conversion) by the down converter 28 into a video signal (an SDTV signal) of the standard TV [NTSC (National Television System Committee)] system, and is input to the image processing unit 18.

Although described later in detail, the image processing unit 18 performs control for performing the AF frame auto-tracking of a certain subject, which is specified by an operator, in a taken subject image through pattern matching processing. Further, the image processing unit 18 performs face identification on the subject person in the taken subject image. Then, if it is identified that the subject person is a subject (a focusing target) set to be automatically tracked by the autofocus function, the image processing unit 18 may perform autofocus control on the lens unit 14 through the AF unit 26. Here, it is necessary to determine whether or not the currently photographed subject is a target which is automatically tracked by the autofocus function. For the determination, a high quality image based on an HDTV signal is not necessary, and an image based on a video signal (an SDTV signal) based on a standard TV system is sufficient. Therefore, as described above, the HDTV signal output from the camera main body 12 is converted into the SDTV signal by the down converter 28.

The image processing unit 18 is a unit for specifying the AF frame area (a position, a size, and a shape (an aspect ratio)) when the AF unit 26 of the lens unit 14 performs the AF frame auto-tracking (the focus control) based on the AF as described above. Specifically, the image signal representing the AF frame is generated by the CPU 38, and the CPU 38 calculates the size of the AF frame or the coordinates representing the position (in the photographing image) of the AF frame on the screen.

AF frame information for specifying the AF frame area in the photographing image (a photographing screen) of the television camera 10 is provided from the image processing unit 18 to the lens unit 14 by the serial communication. The AF unit 26 sets the AF frame area on the basis of the AF frame information acquired from the image processing unit 18 and performs the AF processing as described above.

The image processing unit 18 mainly includes a main board 30, a pattern matching processing calculation board 32, and a face identification processing calculation board 34. The main board 30, the pattern matching processing calculation board 32, and the face identification processing calculation board 34 are respectively equipped with CPUs 38, 50, and 52. On each of the boards, each calculation processing is performed. The CPUs 38, 50, and 52 are connected via a BUS line or a control line so as to exchange data with each other and perform synchronization among the calculation processing. Further, the image processing unit 18 has a face identification data card 74 in which face identification data for performing the face identification processing is stored. Further, although described in detail later, the image processing unit 18 includes a memory 39 in which the face direction of the subject detected from the image is registered together with the coordinates representing the position of the AF frame on the screen. The face direction of the subject and the coordinates representing the position of the AF frame on the screen are registered (stored) in the memory 39 by the CPU 38.

The overall processing in the image processing unit 18 is performed in the main board 30. The main board 30 is provided with not only the CPU 38 for performing the calculation processing but also a SCI 30*a*, a decoder (the A/D converter) 36, a superimposer 42, a RAM 40, and the like.

The SCI 30a is, as described above, an interface circuit for performing the serial communication with the SCI 14a of the lens unit 14, and transmits the AF frame information and the like to the lens unit 14.

The decoder 36 is a circuit for converting the video signal (the SDTV signal) of the photographing video of the television camera 10 input from the down converter 28 to the image processing unit 18 into data which can be digitally processed by the image processing unit 18. The decoder 36 performs an A/D conversion processing and the like for converting the analog SDTV signal into a video signal of digital data.

The RAM 40 is a memory for temporarily storing the data used in the calculation processing of the CPU 38.

On the other hand, the pattern matching processing calculation board 32 and the face identification processing calculation board 34 are calculation boards for individually performing the pattern matching processing and the face detection/identification processing. These boards respectively include not only the CPUs 50 and 52 for performing the calculation processing but also VRAMs 54 and 56 for temporarily storing the image data.

Further, the image processing unit 18 is integrally provided with an operation section 20, or a part of the operation section 20 or all operation members are provided on a unit separate from the image processing unit 18, and those are connected through a cable and the like.

Although detailed description thereof is omitted, in the operation section 20, operation members are provided. The operation members include: a position operation member 60 (for example, a joy stick or a track ball) for vertically moving the position of the AF frame by manual operation of a user; a size operation member 62 (for example, a handle) for changing the size of the AF frame by manual operation; a shape operation member 64 (for example, a handle) for changing the shape of the AF frame by manual operation; a tracking start switch 68 for instructing start of the AF frame auto-tracking; and a tracking stop switch 70 for instructing stop of the AF frame auto-tracking. Setting states of these operation members 60, 62, 64, 68, and 70 can be read by the image processing unit 18 (the CPU 38 of main board 30 to be described later).

Furthermore, the LCD equipped with touch panel 66 is configured to enable an input operation for setting the AF frame auto-tracking mode by a touch operation. The image displayed on the LCD equipped with touch panel 66 is appropriately changed by the CPU 38 of the image processing unit 18 in accordance with the setting contents.

Further, the image displayed on the LCD equipped with touch panel 66 is acquired through the superimposer 42 of the main board 30. The superimposer 42 is configured to synthesize the video signal of the photographing video of the television camera 10 received from the decoder 36 with the image signal generated by the CPU 38. With such a configuration, similarly to the viewfinder 13 provided on the camera main body 12, the LCD equipped with touch panel 66 is able to display a video obtained by superimposing the image of the AF frame, which is set currently, on the photographing video which is photographed by the television camera 10. By performing the touch operation on the screen, a user is able to perform the same operations as the operations using the operation members 60, 62, 64, 68, and 70.

Further, the operation section 20 is provided with not only the LCD equipped with touch panel 66 but also an external monitor 72, and is configured to display the same image as that displayed on the LCD equipped with touch panel 66. In addition, the external monitor 72 assists, for example, a focusing man and the like other than a cameraman to view the monitor and appropriately input instruction with the aid of the touch panel function.

According to the embodiment, the system for automatically tracking the AF frame is able to track a person by performing pattern matching. In this case, the system is able to track the tracking target reliably without tracking failure even when a plurality of persons pass across each other on the screen.

Next, an operation of the autofocus system according to the embodiment of the invention will be described with reference to the accompanying flowchart.

FIG. 2 is a flowchart illustrating the operation of the embodiment of the invention.

First, in step S100 of FIG. 2, the cameraman (an operator) operates the operation members such as the position operation member 60, the size operation member 62, and the shape operation member 64 of the operation section 20 while viewing the video and the AF frame displayed on the screen of the viewfinder 13 or the LCD equipped with touch panel 66 when starting photographing. In addition, the cameraman sets the AF frame area so as to make the tracking target object as a focusing target to come into the AF frame area. In such a manner, the target object is brought into focus by the AF processing in the lens CPU of the lens unit 14.

Next, in step S102, the tracking is started. Then, in step S104, the CPU 38 of the image processing unit 18 acquires the photographing image corresponding to one screen (one frame) from the video signal acquired from the AF unit 26 (the AF processing section) of the lens unit 14.

Then, in step S106, the CPU 38 of the image processing unit 18 detects a face and a direction of the face from the acquired image. Specifically, the CPU 38 of the image processing unit 18 also functions as the face direction detection unit.

Next, in step S108, the CPU 38 updates the AF frame in accordance with the subject in the currently acquired image. Then, in step S110, the CPU 38 of the image processing unit 18 registers the face direction detected as described above in the memory 39 in order to track the subject. At this time, not only the face direction but also the coordinates representing the position of the AF frame of the subject on the screen is registered.

Next, in step S112, an image of the next frame is acquired. In step S114, the face and the face direction in the currently acquired image are detected.

Next, in step S116, by comparing the currently detected face direction with the face direction registered in the memory 39, it is determined whether or not the same direction as the face direction registered in the memory 39 is detected. This comparing is performed in the CPU 38 of the image processing unit 18 (the face direction comparing unit).

In step S116, if the same face direction as the registered face direction is detected from the image which is read out at the current time, it is determined in the next step S118 whether the subject having the same face direction as the registered face direction is one person.

Figure 3:
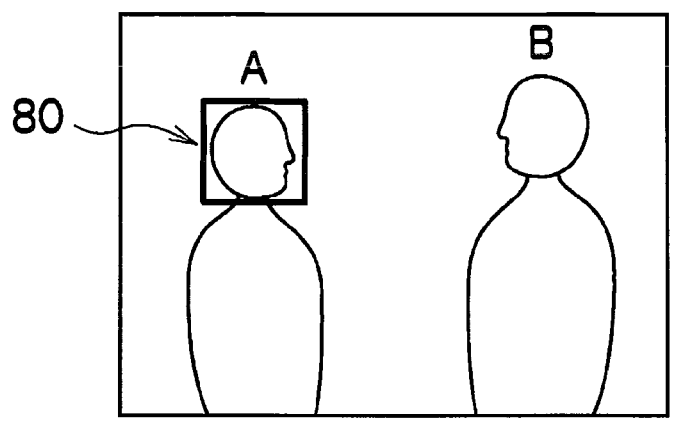
FIG. 3 is an explanatory diagram illustrating an exemplary image in a case where the subject is the only person on a screen whose face direction is the same as the registered face direction.

For example, as shown in FIG. 3, even if a plurality of subjects (the subject A and the subject B) exits on the screen, the subject having the same face direction as the registered face direction may be one person like the subject A. In this case, the subject B having a different face direction from the registered face direction is no matter. Hence, by setting the AF frame 80 on the subject A, the person is tracked as a tracking target.

Further, in step S118, if the subject having the same face direction as the registered face direction is not one person but a plurality of persons, it is determined in step S120 whether or not the face corresponds to the registered face direction. If the face corresponds thereto, the face having coordinates closest to the previous AF frame is determined as a tracking target in step S122, and then the AF frame is set on the face.

Figure 4A:
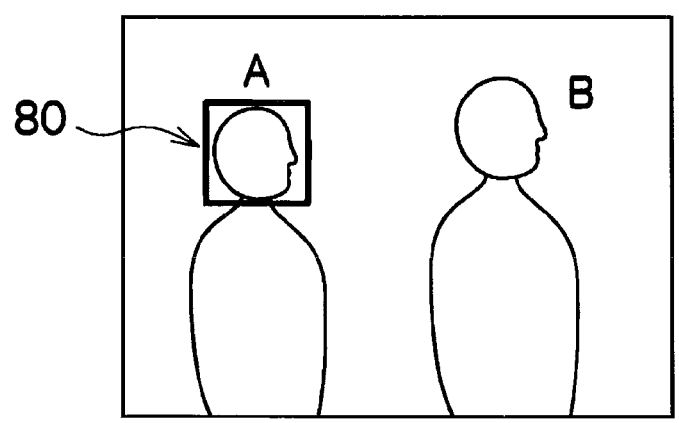
Figure 4B:
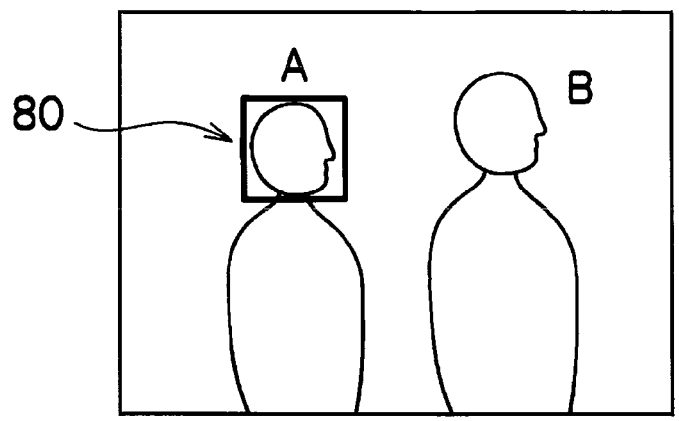

For example, FIGS. 4A and 4B show an example in which the plurality of subjects, which have the same face direction as the registered face direction, including the subject A and the subject B exists on the screen. However, here, FIG. 4A shows an image of the frame which is read at the previous time, and FIG. 4B shows the image of the frame which is read at the current time.

As described above, in the current image shown in FIG. 4B, the subject having the same face direction as the registered face direction is two person of the subject A and the subject B. In this case, by comparing the coordinates of the AF frame with that of the AF frame 80 of the tracking target (the subject A) in the image of the frame read at the previous time shown in FIG. 4A, it is determined which one is closer thereto. In FIG. 4B, an AF frame corresponding to the face of the subject B is not indicated. Even if it is indicated, the coordinates of the previous AF frame 80 shown in FIG. 4A are closer to that of the subject A even in FIG. 4B. Therefore, as shown in FIG. 4B, the AF frame 80 as a tracking area is set on the subject A, and the tracking is continued.

Furthermore, if the face having the same face direction does not exist, the flow returns to step S112 without performing the update of the AF frame and the registration of the face direction. Then, the image of the next frame is acquired, and the above-mentioned processing is repeated.

Further, in step S116 mentioned above, the same face direction as the registered face direction may not be detected. That is, the subject having the same face direction as the registered face direction may not exist. In this case, since the face direction is abruptly changed, it is assumed that the subject having a different face direction passes across (crosses over) the front of the target which has been tracked. Under the assumption, the flow returns to step S112 without performing the update of the AF frame and the registration of the face direction, and the image of the next frame is acquired.

Figure 5A:
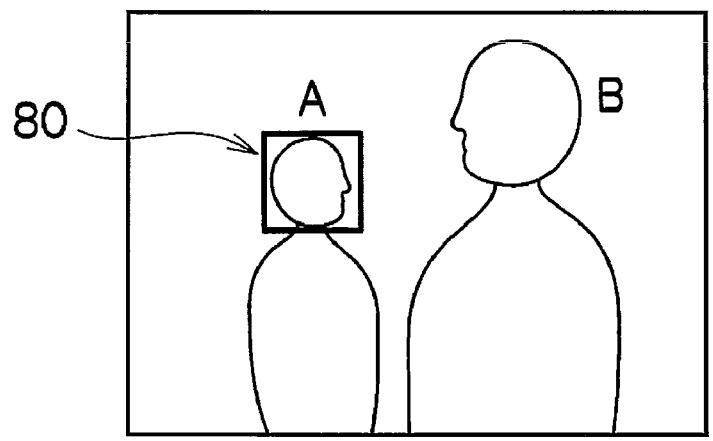
FIGS. 5A to 5C are explanatory diagrams illustrating exemplary images in a case where people whose face directions are different from each other pass in front each other.
Figure 5B:
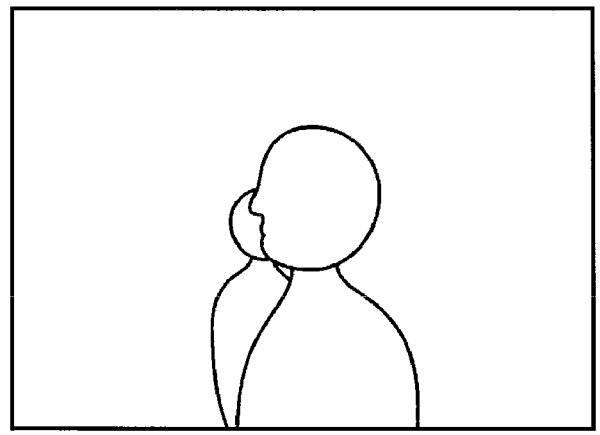
Figure 5C:
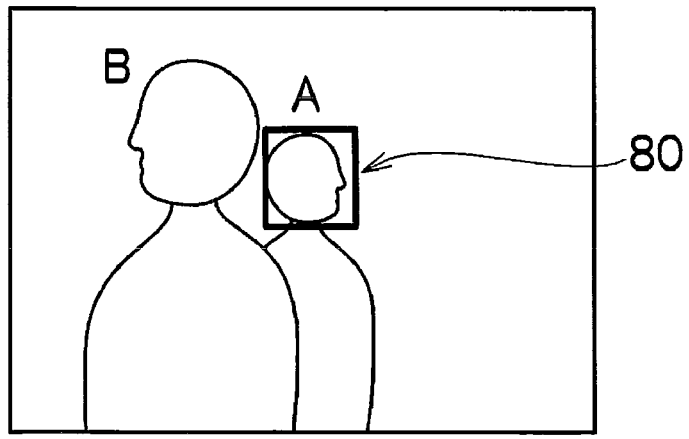

As a specific example of the above-mentioned case, FIGS. 5A to 5C show a case where the persons having different face direction pass across each other. Specifically, first, when the subject A is being tracked by setting the AF frame 80 thereon as shown in FIG. 5A, the subject B having an opposite face direction approaches. In the case where the subject B passes across the front of the subject A as shown in FIG. 5B, the determination in step S116 is made by acquiring the image of FIG. 5B. Then, since the subject B is in front of the subject A in FIG. 5B, the subject A is covered, and the registered face direction representing the subject A as the target which has been tracked is not detected. Accordingly, the update of the AF frame and the registration of the face direction are not performed herein.

Then, the next image as shown in FIG. 5C is acquired. As shown in FIG. 5C, when the subject B passed and the subject A corresponding to the registered face direction appears again, the subject A is tracked again by setting the AF frame 80 on the subject A.

Furthermore, in step S120 mentioned above, even if the face corresponding to the registered face direction does not exist, the subject having the different face direction may pass across the front of the target which has been tracked as described herein. In this case, as described above, the flow returns to step S112 without performing the update of the AF frame and the registration of the face direction, and the next image is acquired.

In step S118 mentioned above, it is determined whether or not the subject having the same face direction as the registered face direction is one person. After that, in step S124, it is determined whether or not the AF frame size is significantly changed.

Figure 6A:
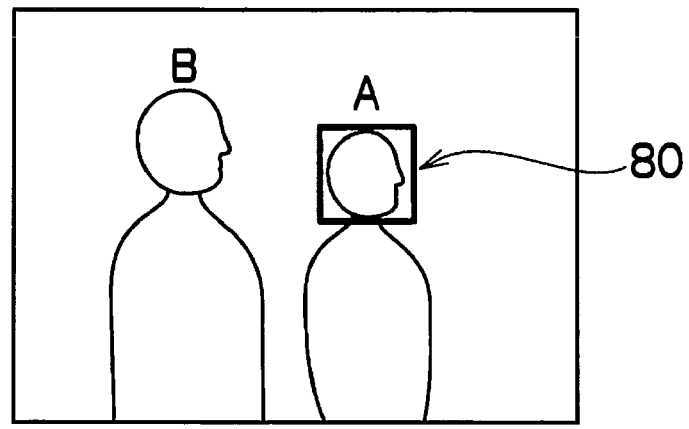
FIGS. 6A to 6C are explanatory diagrams illustrating exemplary images in a case where a subject whose face direction are the same passes across the front of a currently tracked subject.
Figure 6B:
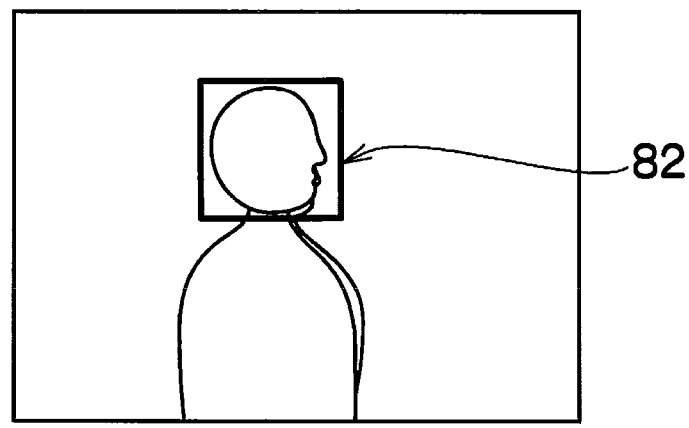
Figure 6C:
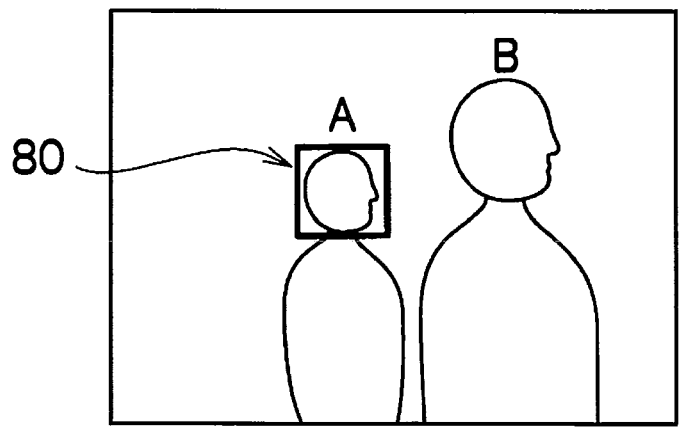

The above-mentioned determination is for, for example, the case where the subject having the same face direction as that of the currently tracked subject passses across the front of the currently tracked subject as shown in FIGS. 6A to 6C Specifically, as shown in FIG. 6A, the subject A may be currently tracked by setting the AF frame 80 thereon.

At this time, as shown in FIG. 6B, when the subject B having the same face direction passes across the subject A, the subject B has the same face direction as the subject A, and thus the AF frame 82 is set on the subject B.

However, as can be seen clearly from FIG. 6B, the AF frame 82 is remarkably larger than the AF frame 80 of the subject A which has been tracked. The reason why the AF frame size is significantly changed as described above is not that the subject A moves but that the different subject B passes across the front of the subject A. That is, the reason is that the face of the subject B in front thereof is larger than that of the subject B when the image of the face is taken.

Accordingly, when the AF frame size is significantly changed, it is determined that a different subject having the same face direction as the subject, which has been tracked, passes across the front of the subject which has been tracked. Under the determination, the flow returns to step S112 without performing the update of the AF frame and the registration of the face direction, and the next image is acquired.

Then, when the subject A appears again in the subsequently acquired image as shown in FIG. 6C, the subject A is tracked again by setting the AF frame 80 on the subject A.

Further, in the determination in step S124, the AF frame size is changed but an amount of the change may not be so large. In this case, the subject which has been tracked is likely to move a little bit without changing the face direction thereof. Therefore, the tracking of the subject is continued without change.

Then, in step S126, the AF frame size is updated, and in step S128, the AF frame is updated. In step S130, the face direction of the currently tracked subject is registered again.

Then, the flow returns to step S112, the next image is acquired. Thereafter, the above-mentioned processing is repeated.

As described above, according to the embodiment, when the face is detected, the direction of the face is also detected, and when the AF frame is updated, the face direction is sequentially registered and updated. Hence, even when a plurality of persons move on the screen, the persons cross over each other, and one person passes across the front of another person, it is possible to solve the problem of tracking failure or the problem of tracking a different subject which is not a tracking target.

As described above, the autofocus system according to the invention has described in detail. However, the invention is not limited to the examples mentioned above, and it is apparent that various modifications and variations may be made without departing from the technical scope of the invention.

What is claimed is:

1. An autofocus system comprising:
    an image pickup unit that takes a subject image formed by an optical system;
    an autofocus unit that performs focus adjustment on the optical system so as to bring into focus a subject within a predetermined AF area in a photographing image taken by the image pickup unit;

a tracking unit that moves an AF frame, which indicates an outline of the AF area, in accordance with the movement of the subject within the photographing image taken by the image pickup unit;

a face direction detection unit that detects a face direction of the subject from the photographing image;

a face direction registration unit that registers the face direction of the subject together with coordinates which represent a position of the AF frame in the photographing image; and a face direction comparing unit that compares the detected face direction of the subject with the registered face direction, wherein tracking of the subject is performed by comparing the face direction, which is detected from the subject within the photographing image, with the registered face direction.

2. The autofocus system according to claim 1, wherein whenever the photographing image is loaded, the face direction which is detected from the photographing image by the face direction detection unit is registered, and the AF frame is updated.

3. The autofocus system according to claim 1, wherein when the face direction comparing unit detects only one person as a subject whose face direction is the same as the registered face direction in the photographing image, tracking of the subject who is the one person is performed.

4. The autofocus system according to claim 1, wherein when the face direction comparing unit detects a plurality of subjects whose face directions are the same as the registered face direction in the photographing image, the face direction comparing unit additionally compares coordinates representing positions of AF frames in the photographing image, with the coordinates of the registered AF frame, and tracking of the subject is performed on a subject corresponding to coordinates of an AF frame closet to the coordinates of the registered AF frame.

5. The autofocus system according to claim 1, wherein when the face direction comparing unit does not detect the subject whose face direction is the same as the registered face direction in the photographing image, the face direction registration unit does not register the face direction detected from the latest photographing image, and the tracking unit does not update the AF frame.

6. The autofocus system according to claim 1, wherein when a size of the AF frame of the subject tracked at a current time is abruptly and significantly changed relative to a size of the AF frame registered at a previous time, the face direction registration unit does not register the face direction of the subject whose AF frame size is abruptly and significantly changed, and the tracking unit does not update the AF frame to the AF frame whose size is significantly changed.

* * * * *